(12) United States Patent
Kim et al.

(10) Patent No.: US 12,537,395 B2
(45) Date of Patent: Jan. 27, 2026

(54) WIRELESS POWER TRANSMISSION DEVICE, WIRELESS POWER RECEPTION DEVICE, AND WIRELESS POWER TRANSMISSION AND RECEPTION SYSTEM COMPRISING SAME

(71) Applicant: BANF CO., LTD., Seoul (KR)

(72) Inventors: Young Sun Kim, Gunpo-si (KR); Ji Young Song, Sejong-si (KR)

(73) Assignee: BANF CO., LTD., Seoul (KR)

( * ) Notice: Subject to any disclaimer, the term of this patent is extended or adjusted under 35 U.S.C. 154(b) by 0 days.

(21) Appl. No.: 18/290,142

(22) PCT Filed: May 6, 2022

(86) PCT No.: PCT/KR2022/006526
§ 371 (c)(1),
(2) Date: Nov. 9, 2023

(87) PCT Pub. No.: WO2022/245027
PCT Pub. Date: Nov. 24, 2022

(65) Prior Publication Data
US 2024/0266885 A1 Aug. 8, 2024

(30) Foreign Application Priority Data

May 21, 2021 (KR) .................. 10-2021-0065804
Jul. 20, 2021 (KR) .................. 10-2021-0094912

(51) Int. Cl.
*H02J 50/40* (2016.01)
*H02J 50/12* (2016.01)
*H03H 7/38* (2006.01)

(52) U.S. Cl.
CPC .............. *H02J 50/40* (2016.02); *H02J 50/12* (2016.02); *H03H 7/38* (2013.01)

(58) Field of Classification Search
CPC ........ H02J 50/40; H02J 50/12; H02J 7/00304; H03H 7/38; H03H 7/40; G01R 19/0038; G01R 19/16566
See application file for complete search history.

(56) References Cited

U.S. PATENT DOCUMENTS 8,855,554 B2 * 10/2014 Cook ...................... H02J 50/80
                                                        307/104
9,094,055 B2 * 7/2015 Low ........................ H02J 50/12
(Continued)

FOREIGN PATENT DOCUMENTS

KR  10-2014-0036188 A   3/2014
KR  10-2016-0143044 A   12/2016
KR  10-2021-0034282 A   3/2021

OTHER PUBLICATIONS

International Search Report in International Application No. PCT/KR2022/006526, dated Aug. 23, 2022, 2 pages.

*Primary Examiner* — Daniel Kessie
*Assistant Examiner* — Brian K Baxter
(74) *Attorney, Agent, or Firm* — Park, Kim & Suh, LLC

(57) ABSTRACT

The present invention relates to a wireless power transmission device capable of stably operating without controlling the amount of power to prevent a circuit failure due to an overcurrent, when there is a change in the number of wireless power reception devices in a power transmission area of the wireless power transmission device, during the transmission of power using a magnetic resonance coupling method, a wireless power reception device, and a wireless power transmission and reception system including the wireless power transmission device and the wireless power reception device.

8 Claims, 5 Drawing Sheets

(56) References Cited

U.S. PATENT DOCUMENTS

| | | | | |
|---|---|---|---|---|
| 10,389,162 B2* | 8/2019 | Menegoli | | H02J 50/70 |
| 10,454,317 B2* | 10/2019 | You | | H03H 11/28 |
| 10,622,141 B2* | 4/2020 | Kawai | | H04B 5/79 |
| 10,700,554 B2* | 6/2020 | Ikefuji | | H02J 7/00 |
| 2011/0080051 A1* | 4/2011 | Lee | | H01F 38/14 |
| | | | | 307/104 |
| 2012/0267960 A1* | 10/2012 | Low | | H02J 50/12 |
| | | | | 307/104 |
| 2012/0313445 A1* | 12/2012 | Park | | H04B 5/26 |
| | | | | 307/104 |
| 2013/0043735 A1* | 2/2013 | Low | | H04B 5/24 |
| | | | | 307/104 |
| 2013/0062959 A1* | 3/2013 | Lee | | H02J 50/12 |
| | | | | 307/104 |
| 2013/0234527 A1* | 9/2013 | Ishihara | | H02J 50/12 |
| | | | | 307/104 |
| 2013/0241300 A1* | 9/2013 | Miyamoto | | H02J 50/12 |
| | | | | 307/104 |
| 2013/0264997 A1* | 10/2013 | Lee | | H02J 50/12 |
| | | | | 320/106 |
| 2013/0307344 A1* | 11/2013 | Cheon | | H02J 50/12 |
| | | | | 307/104 |
| 2015/0171657 A1* | 6/2015 | Wheeland | | H04B 5/79 |
| | | | | 307/104 |
| 2015/0200548 A1 | 7/2015 | Covic et al. | | |
| 2015/0236517 A1 | 8/2015 | Deguchi et al. | | |
| 2015/0244341 A1* | 8/2015 | Ritter | | H02J 50/80 |
| | | | | 307/104 |
| 2015/0326141 A1* | 11/2015 | Takahashi | | H01F 30/00 |
| | | | | 363/126 |
| 2015/0380950 A1* | 12/2015 | Ogasawara | | H02J 50/80 |
| | | | | 307/104 |
| 2016/0028443 A1* | 1/2016 | Kim | | H02J 50/80 |
| | | | | 307/104 |
| 2016/0218549 A1* | 7/2016 | Hirobe | | H02J 7/00034 |
| 2016/0380485 A1* | 12/2016 | Murayama | | H02J 7/00034 |
| | | | | 307/104 |
| 2018/0138871 A1* | 5/2018 | Li | | H03H 7/38 |
| 2018/0226839 A1* | 8/2018 | Higaki | | H02J 50/402 |
| 2018/0337547 A1 | 11/2018 | Menegoli et al. | | |
| 2021/0320527 A1* | 10/2021 | Lee | | H04B 5/79 |
| 2023/0110224 A1* | 4/2023 | Shibanuma | | B60L 58/20 |

* cited by examiner

WIRELESS POWER TRANSMISSION DEVICE, WIRELESS POWER RECEPTION DEVICE, AND WIRELESS POWER TRANSMISSION AND RECEPTION SYSTEM COMPRISING SAME

CROSS-REFERENCE TO RELATED APPLICATIONS

This application is a National Phase Application of PCT International Application No. PCT/KR2022/006526, which was filed on May 6, 2022, and which claims priority from Korean Patent Application No. 10-2021-0065804 filed on May 21, 2021, and Korean Patent Application No. 10-2021-0094912 filed on Jul. 20, 2021. The disclosures of the above patent application are incorporated herein by reference in their entirety.

TECHNICAL FIELD

The present invention relates to a wireless power transmission device and a wireless power reception device, and a wireless power transmission and reception system including the same. More specifically, the present invention relates to a wireless power transmission device capable of stably operating without controlling the amount of power to prevent a circuit failure due to an overcurrent, when there is a change in the number of wireless power reception devices in a power transmission area of the wireless power transmission device, during the transmission of power using a magnetic resonance coupling method, a wireless power reception device, and a wireless power transmission and reception system including the wireless power transmission device and the wireless power reception device.

BACKGROUND ART

Wireless power transmission is a technique for wirelessly supplying power to household electric appliances or electric cars without existing power lines, and researches related thereto are being actively conducted because devices that need be charged using a power cable can be wirelessly charged without being connected to a power outlet.

Wireless power transmission techniques may be largely divided into a magnetic induction method, a magnetic resonance method, and a microwave method. The magnetic induction method is a technique using magnetic induction coupling between adjacent coils, in which the distance between two coils, i.e., a power transmission coil and a power reception coil, is several centimeters or less and transmission efficiency is greatly influenced by conditions of arrangement of the two coils. The magnetic resonance method is a technique for transmitting non-radiation magnetic field energy between two separate resonators by resonance coupling, in which power can be wirelessly transmitted at a distance of about 1 to 2 meters between a power transmission coil and a power reception power transmission coil, the two coils can be more flexibly arranged than in the magnetic induction method, and a wireless charging range can be expanded using a relay method. The microwave method is a technique for transmitting power by emitting ultra-high-frequency electromagnetic waves, such as microwaves, through an antenna, in which power can be wirelessly transmitted to a long distance but safety issues caused by electromagnetic waves should be considered.

A wireless power transmission and reception system includes a wireless power transmission device that wirelessly transmits power and a wireless power reception device that wirelessly receives the power. In general, maximum power can be transmitted in the wireless power transmission and reception system when the wireless power transmission device and the wireless power reception device have the same resonance frequency.

Meanwhile, the amount of power of the wireless power transmission device should be controlled in terms of circuit safety to avoid a circuit failure caused by an overcurrent that may be generated before the wireless power reception device approaches a power transmission area of the wireless power transmission device during wireless power transmission using magnetic coupling of the magnetic resonance method or after the wireless power reception device is out of the power transmission area of the wireless power transmission device after receiving power in the power transmission area.

In a wireless power transmission and reception system of the related art, for optimization of impedance matching of resonant circuits, each of a wireless power transmission device and a wireless power reception device includes a feedback control circuit for feedback control of a receiving voltage or a current and a communication circuit for transmission of a feedback signal from the wireless power reception device to the wireless power reception device. In addition, a control means such as a CPU power circuit should be further provided to use a voltage lower than an input voltage of a power supply unit circuit or a power inverter circuit included in an inverter circuit of the wireless power transmission device. Therefore, a circuit configuration is very complicated and thus manufacturing costs increase.

FIG. 1 is a diagram illustrating configurations of a wireless power transmission device and a wireless power reception device, and a wireless power transmission and reception system including the same, according to the related art.

As shown in FIG. 1, in a wireless power transmission and reception system 30 of the related art, a wireless power transmission device 10 using a magnetic resonance method includes a direct-current (DC) power control circuit 14 that controls external DC power, an inverter circuit 13 that converts DC power into a high-frequency signal, an impedance matching circuit 12, and a power transmission coil 11. The wireless power transmission device 10 further includes a control circuit 15 that controls power of a wireless power reception device 20 while generating a resonance frequency for driving the inverter circuit 13, and a communication circuit 16.

The wireless power transmission device 10 performs feedback control by taking into account the amount of power received by the wireless power reception device 20 through communication with the wireless power reception device 20, and includes the control circuit 15 to perform feedback control. A power control method employed in the wireless power transmission device 10 may be a duty ratio control method of an inverter circuit or a method of controlling an input voltage to be applied to an inverter.

In the wireless power transmission and reception system 30 of the related art, the wireless power reception device 20 includes a power reception coil 21, a matching circuit 22, a rectifying circuit 23 that converts a radio-frequency (RF) AC signal into a DC signal, a voltage stabilization circuit 24, and a conversion circuit 25 that converts a voltage into a DC voltage. The wireless power transmission device 20 further includes a communication circuit 27 that measures an output voltage or output current of the voltage stabilization circuit 24 or the conversion circuit 25 and transmits data to the wireless power transmission 10, and a control circuit 26 that transmits data to the wireless power transmission device 10 using the communication circuit 27.

As described above, the wireless power transmission device 10 and the wireless power reception device 20 of the wireless power transmission and reception system 30 of the related art include control circuits, including various types of control devices (e.g., a CPU), and a control algorithm, and a communication circuit is necessarily required to perform control operations as described above, thus complicating a circuit configuration and increasing manufacturing costs.

DISCLOSURE

Technical Problem

The present invention is directed to providing a wireless power transmission device capable of stably operating without controlling the amount of power to prevent a circuit failure due to an overcurrent, when there is a change in the number of wireless power reception devices in a power transmission area of the wireless power transmission device, during the transmission of power by a magnetic resonance coupling method, a wireless power reception device, and a wireless power transmission and reception system including the wireless power transmission device and the wireless power reception device.

Technical Solution

To achieve these objects, the present invention provides A wireless power transmission device for transmitting power to at least one power reception device using magnetic resonance coupling without contact, the wireless power transmission device comprising a resonant circuit including a matching circuit and a power transmission coil, wherein the resonant circuit is designed in such a way that the total impedance of the resonant circuit decreases every time the power reception device is added to a power transmission area of the wireless power transmission device, up to a predetermined number of the power reception devices.

And a total impedance Zs' of the resonant circuit may be defined by:

$$Z'_s = (R_s + R_{sq}) + j\left(2\pi f L_s - \frac{1}{2\pi f C_s} + X_{eq}\right) = R'_s + jX_s,$$

wherein $R_s$ denotes an internal resistance of the resonant circuit,
$R_{eq}$ denotes the sum of equivalent real resistances of a set power receiver,
j is a symbol representing an imaginary number,
f denotes a resonant frequency,
$L_s$ denotes an inductance of the power transmission coil,
$C_s$ denotes a capacitance of the matching circuit,
$X_{eq}$ denotes the sum of equivalent imaginary impedances of the set power receiver,
$R_s'$ denotes the sum of real resistances of the resonant circuit, and
$X_s$ denotes the sum of imaginary parts of impedance of the resonant circuit, and
the resonant circuit may be designed to cause the sum of imaginary parts of impedance $X_s$ to be non-zero when the number of power reception devices receiving power in the power transmission area of the wireless power transmission device is less than the predetermined maximum number and to be zero when the number of power reception devices is equal to the predetermined maximum number, wherein equivalent resistances of the power reception devices are reflected in the sum of imaginary impedances $X_s$.

And when the number of power reception devices receiving power in the power transmission area of the wireless power transmission device is equal to the predetermined maximum number, either an inductance of the power transmission coil of the wireless power transmission device or a capacitance of the matching circuit of the wireless power transmission device may be determined according to the sum of equivalent imaginary impedances of resonant circuits and power reception coils of the predetermined maximum number of power reception devices to cause the sum of imaginary parts of impedance $X_s$ of the resonant circuit to be zero.

And when the number of power reception devices in the power transmission area of the wireless power transmission device is greater than the predetermined maximum number, the sum of imaginary parts of impedances $X_s$ is not zero and the transmission current of the wireless power transmission device may decrease.

And the wireless power transmission device may further comprise an inverter circuit configured to convert external direct-current (DC) power into high-frequency power and supply the high-frequency power to the resonant circuit, and located at a front end of the resonant circuit; an oscillation circuit configured to generate a resonance frequency for driving the inverter circuit; and a DC power supply unit configured to drive the oscillation circuit.

And the wireless power transmission device may further comprise a control means configured to turn on or off DC power to be supplied to the DC power supply unit or a resonance frequency oscillation signal for driving the inverter circuit.

And to achieve these objects, the present invention provides a wireless power reception device for receiving power from a power transmission device by using magnetic resonance coupling without contact, the wireless power reception device comprising: a resonant circuit including a matching circuit and a power reception coil; a rectifying circuit configured to rectify a high-frequency reception power signal, and located at a rear end of the resonant circuit; a voltage stabilization circuit configured to stabilize a rectified output voltage, and located at a rear end of the rectifier circuit; and a direct-current (DC)-to-DC conversion circuit configured to output a predetermined voltage from a stabilized voltage, and located at a rear end of the voltage stabilization circuit.

And to achieve these objects, the present invention provides a wireless power transmission and reception system comprising: the wireless power transmission device; and at least one wireless power reception device.

Advantageous Effects

In a wireless power transmission device and a wireless power reception device and a wireless power transmission and reception system including the same according to the present invention, a total impedance of the wireless power transmission device is designed to decrease whenever the number of power reception devices receiving power in a power transmission area of the wireless power transmission device increases. Thus, a current decreases according to a change in an impedance of the wireless power transmission device and thus the wireless power transmission device may operate without causing a circuit failure, even when the wireless power transmission device does not include a power amount control means.

In the wireless power transmission device and the wireless power reception device and the wireless power transmission and reception system including the same according to the present invention, impedance matching optimization proposed in the present invention and stable power transmission can be performed using only a simple circuit configuration while avoiding complex circuit design that is a problem of the related art.

In addition, according to the wireless power transmission device and the wireless power reception device and the wireless power transmission and reception system including the same according to the present invention, a one-to-many power transmission system can be configured with only a simple circuit configuration, thereby greatly reducing costs.

MODE FOR INVENTION

Hereinafter, embodiments of the present invention will be described in detail with reference to the accompanying drawings. The present invention is, however, not limited thereto and may be embodied in many different forms. Rather, the embodiments set forth herein are provided so that this disclosure will be thorough and complete, and fully convey the scope of the invention to those of ordinary skill in the art. Throughout the specification, the same reference numbers represent the same elements.

The present invention provides a one-to-many wireless power transmission and reception system designed to increase a current according to a change in an impedance of a wireless power transmission device without controlling power of a wireless power reception device in a power transmission area of the wireless power transmission device through a communication circuit, a control circuit, etc. as in the related art, when the number of wireless power reception devices increases in the power transmission area of the wireless power transmission device, thereby greatly simplifying a circuit configuration and avoiding a circuit failure due to an inrush current to stably perform stable wireless power transmission. The wireless power transmission and reception system will be described in detail with reference to FIG. 2 below.

Figure 2:
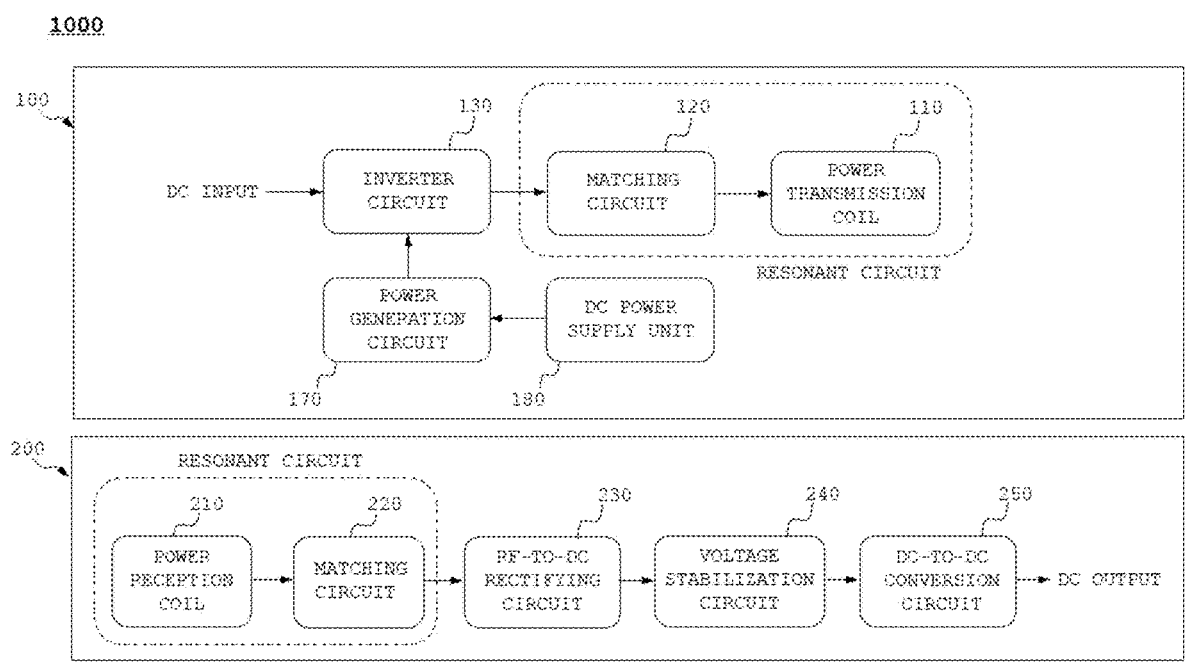
FIG. 2 is a diagram illustrating a wireless power transmission device and a wireless power reception device, and a wireless power transmission and reception system including the same, according to the present invention.

FIG. 2 is a diagram illustrating a wireless power transmission device and a wireless power reception device, and a wireless power transmission and reception system including the same, according to the present invention.

A wireless power transmission and reception system 1000 according to the present invention includes a wireless power transmission device 100 that transmits power to a wireless power reception device 200 using magnetic resonance coupling without contact. The wireless power reception device 100 includes a resonant circuit that includes a matching circuit 120 and a power transmission coil 110. Here, the resonant circuit is designed such that a total impedance thereof decreases as the number of wireless power reception devices 200 receiving power in a power transmission area of the wireless power transmission device 100 sequentially increases to a predetermined maximum number.

That is, the total impedance of the resonant circuit sequentially decreases whenever the number of wireless power reception devices 200 receiving power in the power transmission area of the wireless power transmission device 100 sequentially increases to the predetermined maximum number, thereby increasing a current in the resonant circuit of the wireless power transmission device 100.

When the number of wireless power reception devices 200 in the power transmission area of the wireless power transmission device 100 is greater than the predetermined maximum number, a current in a circuit of the wireless power transmission device 100 decreases and the amount of power supplied to each of the power reception devices 200 decreases compared to that originally designed. Therefore, a user may easily notice the optimal number of power reception devices designed.

In addition, the wireless power transmission device 100 may include an inverter circuit 130 which is located at a front end of the resonant circuit, and converts external direct-current (DC) power into high-frequency power and supplies the high-frequency power to the resonant circuit, an oscillation circuit 170 which generates a resonance frequency for driving the inverter circuit 130, and a DC power supply unit 180, such as an adapter, which drives the oscillate circuit 170. As described above, the wireless power transmission device 100 does not perform feedback control of a receiving voltage, a current, power, and data of the wireless power reception device 200 and thus has a simple circuit configuration.

The wireless power transmission device 100 may further include a control means that turns on/off either a DC current to be supplied to the DC power supply unit 180 or the inverter circuit 130 or a resonance frequency oscillation signal for driving the DC power supply unit 180 or the inverter circuit 130. The control means may be provided in the form of a control switch or a control sensor manipulated by a user to directly detect whether there is a power reception device in the power transmission area. The wireless power transmission device 100 includes an ON/OFF control means to simply prevent unnecessary power consumption therein when the wireless power reception device 200 does not exist in the power transmission area.

The wireless power transmission and reception system 1000 may include one or more wireless power reception devices 200 that receive power from a power transmission device using magnetic resonance coupling without contact. Each of the one or more wireless power reception devices 200 may include a resonant circuit that includes a power reception coil 210 and a matching circuit 220, a rectifying circuit 230 that rectifies a high-frequency reception power signal and located at a rear end of the resonant circuit, a voltage stabilization circuit 240 that stabilizes a rectified output voltage and located at the rear end of the rectifying circuit 230, and a DC-to-DC conversion circuit 250 that outputs a predetermined voltage from a stabilized voltage from a rear end of the voltage stabilization circuit 240.

Similarly, in the wireless power reception device 200 according to the present invention, a communication circuit that transmits feedback data to the wireless power reception device 100 may be omitted unlike in the related art, and matching of a resonant circuit can be optimized without a CPU and a control circuit for power control, thereby simplifying a configuration of a circuit module.

The wireless power reception device 200 may further include a current measuring device 280 that measures a final output current of the wireless power reception device 200, and a frequency conversion means 290 that compares a current measured by the current measuring device 280 with a set current and converts a resonance frequency of the resonant circuit when the measured current value is less than the set current value.

Figure 3:
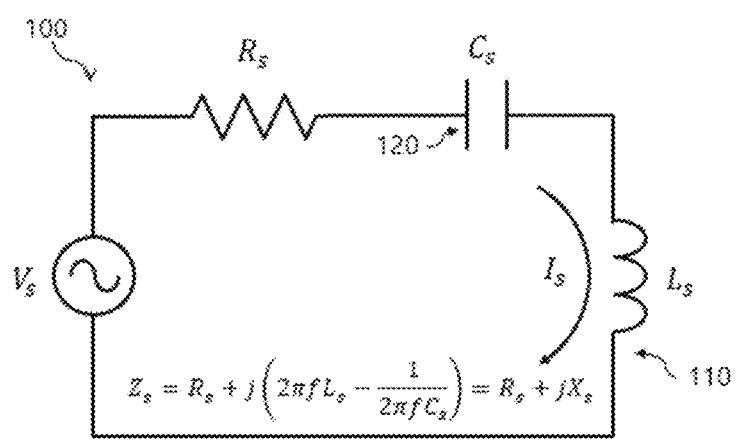
FIG. 3 illustrates a resonant circuit of a wireless power transmission device according to the present invention.
Figure 4:
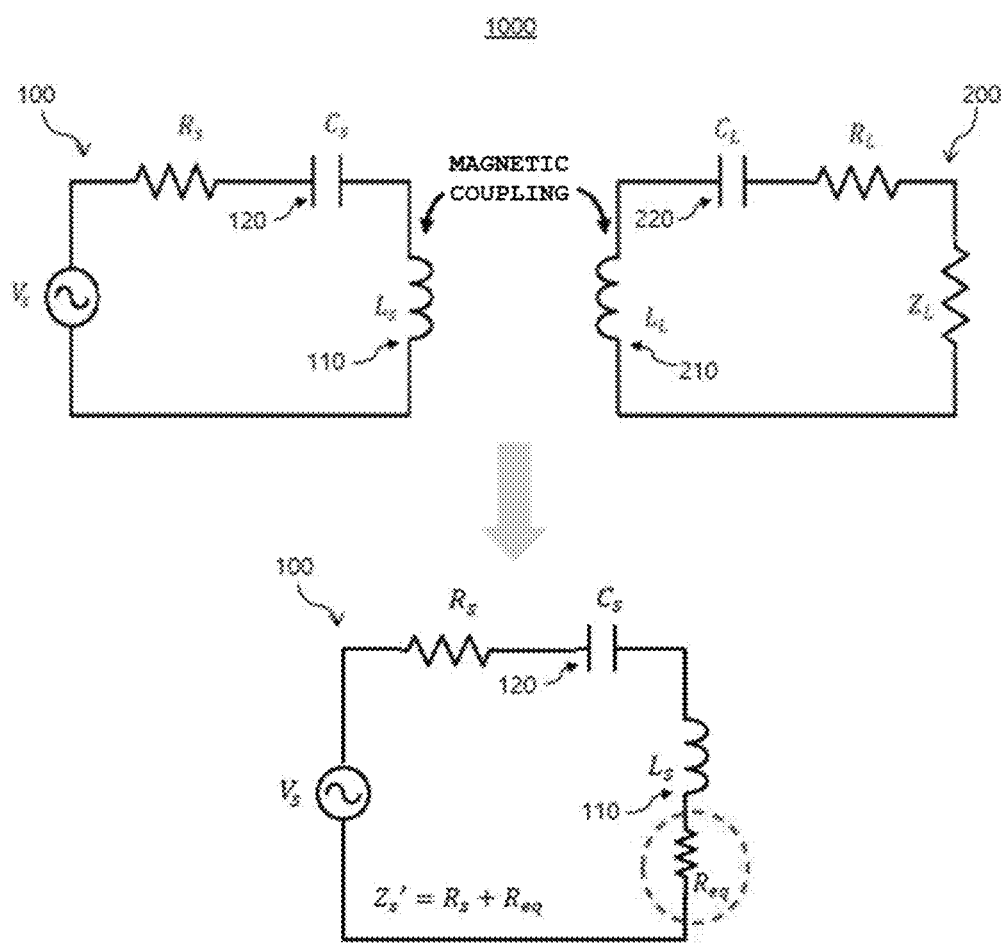
FIG. 4 is a conceptual diagram of a magnetic coupling of a wireless power transmission device and a wireless power reception device of a wireless power transmission and reception system.

FIG. 3 illustrates a resonant circuit of a wireless power transmission device 100 according to the present invention. FIG. 4 is a conceptual diagram of magnetic coupling between a wireless power transmission device and a wireless power reception device of a wireless power transmission and reception system.

Referring to FIG. 3, a total impedance Zs of only a power transmission circuit, i.e., when there is no power receiver charged by a resonant circuit of the wireless power transmission device 100 according to the present invention, may be defined by Equation 1-1 below.

$$Z_s = R_s + j\left(2\pi f L_s - \frac{1}{2\pi f C_s}\right) = R_s + jX_s \quad \text{[Equation 1-1]}$$

In Equation 1-1, $R_s$ denotes an internal resistance of the resonant circuit of the wireless power transmission device 100, j is a symbol representing an imaginary number, f denotes a resonant frequency, $L_s$ denotes an inductance of the power transmission coil 10, $C_s$ denotes a capacitance of the matching circuit 120. In summary, R denotes a real resistance, and $X_s$ denotes an imaginary part of impedance.

In the total impedance Zs of the wireless power transmission device 100, the internal resistance $R_s$ of the resonant circuit may be calculated from the sum of an internal resistance of a wire, an internal resistance of the power transmission coil 110, and an internal resistance of the matching circuit 120.

In addition, as illustrated in FIG. 4, when a power reception device is disposed in the power transmission area of the wireless power transmission device 100, an impedance Zs' according to Equation 1-1 may be converted into Equation 1-2 below.

$$Z'_s = (R_s + R_{eq}) + j\left(2\pi f L_s - \frac{1}{2\pi f C_s} + X_{eq}\right) = R'_s + jX_s \quad \text{[Equation 1-2]}$$

In Equation 1-2, $R_s$ denotes an internal resistance of a resonant circuit, $R_{eq}$ denotes the sum of equivalent real resistances of a set power receiver, j denotes an imaginary number, f denotes a resonant frequency, $L_s$ denotes an inductance of a power transmission coil, $C_s$ denotes a capacitance of a matching circuit, $X_{eq}$ denotes the sum of equivalent imaginary impedances of the set power receiver, $R_s'$ denotes the sum of real resistances of the resonant circuit, and $X_s$ denotes the sum of imaginary parts of impedance.

Meanwhile, the power transmission performance of the wireless power transmission device 100 depends on impedance matching between a power transmission resonant circuit thereof and a power reception resonant circuit of the wireless power reception device 200. An impedance of a power transmission circuit to which an equivalent resistance and an imaginary impedance of a power reception circuit are reflected is defined by Equation 1-1 above.

Accordingly, in the present invention, an impedance is designed to decrease as the number of power reception devices in the power transmission area of the wireless power transmission device 100 sequentially increases to a predetermined maximum number, and when the number of power reception devices is equal to the predetermined maximum number, the sum of imaginary parts of impedance $X_s$ of the resonant circuits of the power reception devices may be designed to be zero.

The total impedance Zs' of the resonant circuit of the wireless power transmission device 100 may be defined by Equation 2 below.

$$|Z'_s| = \sqrt{R'^2_s + X_s^2} = \frac{V_s}{I_s}, \quad \text{[Equation 2]}$$

wherein $R_s'$ denotes a real resistance of the resonant circuit of the wireless power transmission device 100, $X_s$ denotes an imaginary part of impedance, Vs denotes an input voltage of a power transmission resonant circuit, and Is denotes a current flowing through the power transmission resonant circuit.

As shown in Equation 2, the total impedance of the resonant circuit of the wireless power transmission device 100 may be calculated from the real resistance and the imaginary impedance of the resonant circuit, and the intensity of current Is flowing through the resonant circuit of the wireless power transmission device 100 is inversely proportional to the total impedance of the wireless power transmission device 100.

That is, when the number of power reception devices decreases while several power reception devices receiving power in the power transmission area of the wireless power transmission device 100, a current decreases due to the resonant circuit of the wireless power transmission device 100, which is designed such that a total impedance thereof increases, thus maintaining circuit stability.

As shown in FIG. 4, when one wireless power transmission device 200 receives power in the power transmission area of the wireless power transmission device 100 in the wireless power transmission and reception system 1000, the wireless power transmission device 100 may operate as if an equivalent resistance $R_{eq}$ corresponding to a resistance value of the wireless power reception device 200 in which impedance matching is optimized is added to the resonant circuit of the wireless power transmission device 100. This phenomenon can be confirmed through a change of a current in the wireless power transmission device 100.

When there is the wireless power reception device 200 in terms of the wireless power transmission device 100, a total impedance of the resonant circuit of the wireless power transmission device 100 may be calculated by adding an initial impedance of the wireless power transmission device resonant circuit and an equivalent resistance $R_{eq}$ corresponding to a resistance value of the wireless power reception device 200 in which in impedance matching is optimized.

In general, in a wireless power transmission and reception system, impedance matching has been designed such that the imaginary impedance among the real resistance and the imaginary impedance of the wireless power transmission device 100 is close to or approximates zero to maximize power transmission efficiency. Therefore, power has been transmitted under conditions that maximize power transmission efficiency between the wireless power transmission device 100 and the wireless power reception device 200 under load conditions of the wireless power reception device 200 in the power transmission area. Here, an impedance Zs of the wireless power transmission device 100 designed to maximize efficiency in terms of power transmission may be defined by Equation 3 below, as $X_s$, which is an imaginary part in $Z_s' = R_s' + jX_s$ in Equation 1-2 is zero.

$$Z_s' = R_s' + j \cdot 0 = R_s + R_{eq} \qquad \text{[Equation 3]}$$

In Equation 3 above, $R_s$ denotes an initial resistance of a resonant circuit of a wireless power transmission device, and $R_{eq}$ denotes an equivalent resistance with respect to a load resistance of a wireless power reception device in terms of the resonant circuit of the wireless power transmission device.

In the resonant circuit of the wireless power transmission device, the equivalent resistance $R_{eq}$ is designed to minimize or cancel imaginary power according to an optimization theory of a resonant circuit of a power transmission device of the related art, thus resulting in an increase of a total impedance of the resonant circuit of the wireless power transmission device 100.

When the wireless power reception device 200 is completely out of the wireless power transmission device 100 or power transmission is performed only by the wireless power transmission device 100 while there is no wireless power reception device 200 magnetically coupled to the wireless power transmission device 100 not in contact with the wireless power transmission device 100, the equivalent resistance $R_{eq}$ of the wireless power reception device 200 disappears from a total resistance $R_s + R_{eq}$ of the resonant circuit of the wireless power transmission device 100 and thus only the internal resistance $R_s$ of the resonant circuit remains. Accordingly, a current of the resonant circuit may increase sharply, thus causing serious instability. In particular, serious circuit instability may occur when the amount of power to be transmitted is large and there is a strong magnetic coupling between a power transmission coil and a power reception coil.

To help the understanding of circuit stability, a change of an impedance of a resonant circuit of a wireless power transmission device will be described using specific numerical values as examples.

In Equation 3 above, $R_s$ may be understood as a DC resistance of the resonant circuit of the wireless power transmission device 100 and is a very small resistance of several tens to several hundreds of micro-ohms (mΩ) in most cases although it depends on the design of the resonant circuit. In contrast, the equivalent resistance $R_{eq}$ of the wireless power reception device 200 is a large resistance of several to several tens of ohms (Ω) according to the design thereof.

For example, an actual amount of power consumed by the wireless power transmission device 100 for power transmission may be about 125 W, when it is assumed that the wireless power transmission device 100 transmits power under a condition that a power reception device receives power of about 100 W at a power transmission efficiency of about 80% from the resonant circuit of the wireless power transmission device 100 to which a voltage of 24V is input. However, it is assumed that both the transmission efficiency of the resonant circuit of the wireless power transmission device 100 and the transmission efficiency of the resonant circuit of the wireless power reception device 200 are 100%, excluding the transmission efficiency of the resonant circuit of the wireless power transmission device 100 transmitting power to the resonant circuit of the wireless power reception device 200.

In this case, a current flowing through the resonant circuit of the wireless power transmission device 100 is theoretically about 5.2 A, which is a value calculated by dividing 125 W, which is the amount of power consumed by the wireless power transmission device 100, by the input voltage of 24V. Therefore, a total impedance of the resonant circuit of the wireless power transmission device 100 is a value, i.e., about 4.6Ω, calculated by dividing the input voltage of 24V by 5.2 A, which is the current flowing through the resonant circuit. In this case, when it is assumed that an internal circuit resistance $R_s$ of the wireless power transmission device 100 is a small resistance of about 0.5Ω, the equivalent resistance $R_{eq}$ of the wireless power reception device 200 is expected to be about 4.1Ω, which is a result of subtracting the internal circuit resistance $R_s$ of the wireless power transmission device 100 from a total resistance of 4.6Ω of the resonant circuit of the wireless power transmission device 100.

When the wireless power reception device 200 is completely out of the power transmission area of the wireless power transmission device 100 and thus is not magnetically coupled to the wireless power transmission device 100, the equivalent resistance $R_{eq}$ of the wireless power reception device 200 completely disappears in the wireless power transmission device 100 and a total impedance of the resonant circuit of the wireless power transmission device 100 decreases from 4.6Ω, including the equivalent resistance $R_{eq}$, to about 0.5Ω.

Therefore, a current flowing through the resonant circuit of the wireless power transmission device 100 increases sharply from 5.2 A to 48A, which is a result of dividing 24 V by 0.5Ω, due to a sharp decrease in a circuit resistance. In most cases, a circuit may be destroyed when a sharp increase in a current exceeds the standards of current that the circuit can withstand. As described above, when impedance matching optimization is performed according to the related art, a very dangerous situation inevitably occurs in terms of circuit stability.

Therefore, as described above, in the related art, data about the amount of power supplied to the wireless power reception device 200 should be fed back to the wireless power transmission device 100 to allow the wireless power transmission device 100 to perform a power control operation to secure circuit stability in terms of an operation of a power transmission device. To this end, the wireless power transmission device 100 and the wireless power reception device 200 each include a communication circuit to perform data communication between resonant circuits thereof.

The communication circuit of the wireless power transmission device 100 checks whether the wireless power reception device 200 is located in the power transmission area thereof and is ready to receive power, receives, as feedback, an output voltage or a current signal of the wireless power reception device 200 while gradually increasing the amount of power to be transmitted, and controls the amount of power to be transmitted not to give a burden on the circuit, thereby securing circuit stability during the transmission of power.

Figure 1:
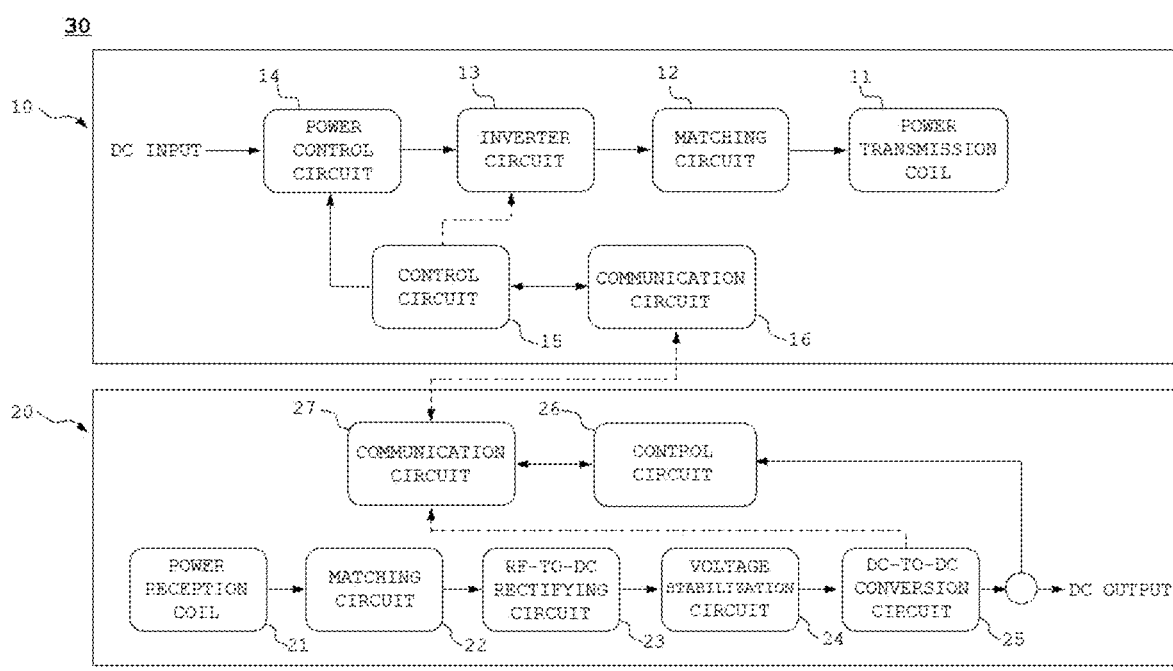
FIG. 1 is a diagram illustrating a wireless power transmission device and a wireless power reception device, and a wireless power transmission and reception system including the same, according to the related art.

Referring to FIG. 1, the wireless power transmission and reception system 30 of the related art is very unstable when impedance matching between a power transmission resonant circuit and a power reception resonant circuit is optimized without receiving feedback about a receiving voltage or current as described above, and thus, the feedback control circuit that performs control and the communication circuit 16 that transmits feedback from the wireless power reception device 20 to the power transmission device 10 are necessarily included therein during the design of the device. The power control circuit 14 included in the inverter circuit 13 of the wireless power transmission device also has a complicated circuit structure to perform power control. Additionally, the DC-to-DC conversion circuit 15 configured to control an input voltage of the inverter circuit 13 of the wireless power transmission device should be provided to control power of a power transmission circuit.

In the wireless power transmission and reception system 30 of the related art, power transmission efficiency can be maximized by setting an imaginary impedance of the resonant circuit of the wireless power transmission device 10 to zero or a value close to zero through impedance matching optimization, but, to this end, both the wireless power transmission device 10 and the wireless power reception device 20 should include a CPU control device, driving firmware, a communication circuit, etc.

Figure 5:
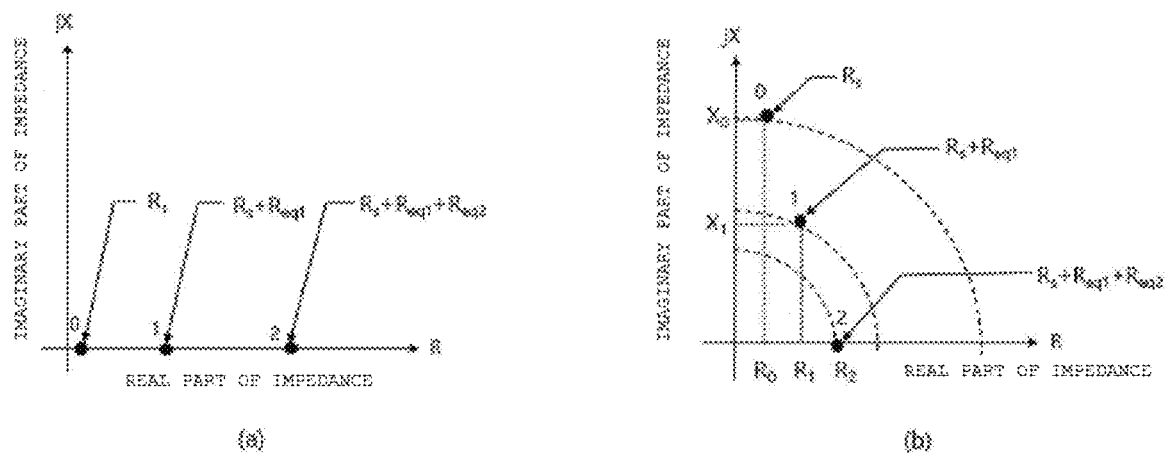
FIG. 5A illustrates a resonant circuit design method of the related art, which is performed based only on a real resistance due to an increase in the number of power receivers while excluding an imaginary impedance, when a wireless power transmission device is optimized to charge up to two power receivers.
FIG. 5B illustrates a method of designing an real resistance and an imaginary impedance according to an increase in the number of power receivers when a wireless power transmission device is optimized to charge up to two power receivers, according to the present invention.

FIG. 5 illustrates a method of designing a real impedance and an imaginary impedance among all impedances of a resonant circuit of a wireless power transmission device. Specifically, FIG. 5 illustrates an impedance design of a wireless power transmission device when a maximum number of wireless power reception devices that may receive power in a power transmission area of the wireless power transmission device is designed to be two. FIG. 5A illustrates an impedance design method of the related art. FIG. 5B illustrates an impedance design method of the present invention.

In the graphs of FIG. 5, R denotes a real resistance, j denotes an imaginary number, X denotes an imaginary impedance, each point corresponds to a total impedance of a wireless power transmission device that changes according to the number of wireless power reception devices, and the number assigned to each point denotes the number of power reception devices receiving power in a power transmission area of the wireless power reception device.

In an impedance design method of the resonant circuit of the wireless power transmission device 10 of the related art shown in FIG. 5A, equivalent resistances $R_{eq}$ of one or more wireless power reception devices operating in terms of the wireless power transmission device 10 are positive resonances and an imaginary impedance is designed to be zero.

Therefore, when a wireless power reception device is out of a power transmission area of a wireless power transmission device and thus magnetic coupling disappears, a real impedance of a resonant circuit of the wireless power transmission device may decrease sharply and thus a current flowing through the wireless power transmission device may increase sharply, thus causing circuit instability or circuit damage.

However, in an impedance design method of a resonant circuit of a wireless power transmission device according to the present invention shown in FIG. 5B, a total impedance decreases as the number of power reception devices receiving power sequentially increases to the predetermined maximum number. Here, it may be assumed that when up to two wireless power reception devices receive power in a power transmission area of the wireless power transmission device, impedances $Z_0$, $Z_1'$, and $Z_2'$ of the resonant circuit of the wireless power transmission device, when there is no wireless power reception devices in the power transmission area of the wireless power transmission device, when there is one wireless power reception devices in the power transmission area of the wireless power transmission device, and when there are two wireless power reception devices in the power transmission area of the wireless power transmission device, are as shown in Equation 4 below, taking into account an equivalent resistance of each of the wireless power reception devices that consists of a real number part and an imaginary number part.

$$Z_o = R_0 + jX_0 \qquad \text{[Equation 4]}$$
$$Z_1' = R_1 + jX_1 = (R_o + A_1) + j(X_0 + B_1)$$
$$Z_2' = R_2 + jX_2 = (R_0 + A_1 + A_2) + j(X_0 + B_1 + B_2)$$

An impedance of the resonant circuit of the wireless power transmission device according to the number of wireless power reception devices may be calculated by Equation 4 below.

$$|Z_0| = \sqrt{R_0^2 + X_0^2} = \frac{V_s}{I_0} \qquad \text{[Equation 5]}$$
$$|Z_1'| = \sqrt{R_1^2 + X_1^2} = \frac{V_s}{I_1}$$
$$|Z_2'| = \sqrt{R_2^2 + X_2^2} = \frac{V_s}{I_2}$$

Referring to Equations 4 and 5 above and FIG. 5B, when there are two wireless power reception devices in the power transmission area of the wireless power transmission device and a wireless power transmission and reception system is designed such that $X_2=X_0+B_1+B_2$, which is an imaginary number part of the wireless power transmission device, is zero, absolute values of an impedance of the resonant circuit of the wireless power transmission device of the present invention are $|Z_0|>|Z_1'|>|Z_2'|$, when listed in order, according to the number of wireless power reception devices. In contrast, currents flowing through the wireless power transmission device are $|I_0|<|I_1|<|I_2|$. Therefore, unlike in the related art, a transmission current increases gradually whenever the number of wireless power reception devices 200 to be charged in the power transmission area of the wireless power transmission device of the present invention increases sequentially within a range of the predetermined maximum number.

When a wireless power reception device is out of the power transmission area of the wireless power transmission device, i.e., when the number of wireless power reception devices in the power transmission area of the wireless power transmission device is zero, a current in the resonant circuit of the wireless power transmission device decreases and thus the resonant circuit can be protected or the stability thereof can be improved without performing feedback control.

To allow the wireless power reception device to transmit power to up to n wireless power reception devices as described above, the system may be configured by designing an inductance of a power transmission coil of the resonant circuit, a capacitance of a matching circuit, etc. such that an imaginary number part, i.e., $x_n = X_0 + B_1 + \ldots + \ldots + B_n$, of an impedance $Z_n'$ of the resonant circuit may be zero when an equivalent resistance, which consists of a real number part and an imaginary number part, of each power reception device is taken into account.

Specifically, the system may be designed by determining the inductance of the power transmission coil of the power transmission device or the capacitance of the matching circuit of the power transmission device according to the sum of equivalent imaginary impedances due to resonant circuits and power reception coils of the maximum number of power reception devices, so that an imaginary impedance may be zero.

Figure 6:
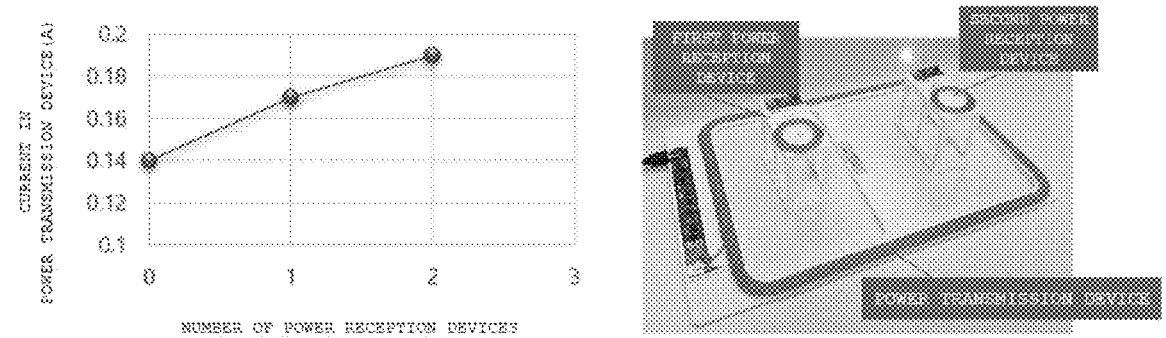
FIG. 6 illustrates a change in a current in a wireless power transmission device when power is supplied from the wireless power transmission device to two wireless power reception devices in a wireless power transmission and reception system, according to the present invention.

FIG. 6 illustrates a change in a current in a wireless power transmission device when power is transmitted to two wireless power reception devices from the wireless power transmission device. Similarly, a case in which a maximum number of wireless power reception devices capable of receiving power in a power transmission area of the wireless power transmission device is designed to be two is shown.

An example of the design will be described using numerical values with respect to the example of FIG. 6. For example, in a system in which an impedance of a power transmission circuit is $0.5 + j85.7\Omega$ when there is only the power transmission circuit, the impedance of the power transmission circuit may be designed to be $31.4 + j63.2\Omega$ when there is one power reception device in an area, and to be $63.2 + j0\Omega$ when there are two power reception devices in the area.

Thus, an impedance when there is no power reception device, an impedance when one power reception device is charged, and an impedance when both two power reception devices are charged are respectively $85.7\Omega$, $70.6\Omega$, and $63.2\Omega$ according to Equation 5, and degrees of change in current are 0.14 A, 0.17 A, and 0.19 A, which are results obtained by dividing an input voltage of 12 V by the impedances. That is, it can be seen that an increase in power receivers to be charged results in an increase in a transmission current and a reduction in power receives to be charged results in a reduction in the transmission current.

In the embodiment of FIG. 6, a power transmission circuit is designed in consideration of up to two power reception devices, and thus, an impedance when three power reception devices are located in the area is higher than that when two power reception devices are located in the area, thus reducing a current to flow through the power transmission circuit.

FIG. 6 also illustrates a graph showing a change in a current in a wireless power transmission device 100 with a plate type power transmission coil when two wireless power reception devices 200 are sequentially placed in a power transmission area of the wireless power transmission device 100.

It can be seen from the graph that in the wireless power transmission and reception system 1000 of the present invention, even when there is no wireless power reception device 200 in the power transmission area of the wireless power transmission device 100, a current flowing through the wireless power transmission device 100 is not 0 (A) and increases as the number of wireless power reception devices 200 increases. That is, it can be seen that there may be some reactive power but the configuration of a circuit can be simplified and the circuit can be protected.

While the present invention has been described above with respect to exemplary embodiments thereof, it would be understood by those of ordinary skilled in the art that various changes and modifications may be made without departing from the technical conception and scope of the present invention defined in the following claims. Thus, it is clear that all modifications are included in the technical scope of the present invention as long as they include the components as claimed in the claims of the present invention.

The invention claimed is:

1. A wireless power transmission device for transmitting power to at least one power reception device using magnetic resonance coupling without contact, the wireless power transmission device comprising:

a resonant circuit including a matching circuit and a power transmission coil, wherein a total impedance Zs' of the resonant circuit is defined by:

$$Z_s' = (R_s + R_{sq}) + j\left(2\pi f L_s - \frac{1}{2\pi f C_s} + X_{eq}\right) = R_s' + jX_s,$$

wherein $R_s$ denotes an internal resistance of the resonant circuit, $R_{eq}$ denotes a sum of equivalent real resistances of a set power receiver, j is a symbol representing an imaginary number, f denotes a resonant frequency, $L_s$ denotes an inductance of the power transmission coil, $C_s$ denotes a capacitance of the matching circuit, $X_{eq}$ denotes a sum of equivalent imaginary impedances of the set power receiver, $R_s'$ denotes a sum of real resistances of the resonant circuit, and $X_s$ denotes a sum of imaginary parts of impedance of the resonant circuit, wherein the inductance $L_s$ of the power transmission coil and the capacitance $C_s$ of the matching circuit are determined such that $$X_s = \left(2\pi f L_s - \frac{1}{2\pi f C_S} + X_{eq}\right)$$

is non-zero when a number of power reception devices receiving power in a power transmission area of the wireless power transmission device is less than a predetermined maximum number, and $$X_s = \left(2\pi f L_s - \frac{1}{2\pi f C_S} + X_{eq}\right)$$

is zero when the number of the power reception devices is equal to the predetermined maximum number,
  wherein when the number of the power reception devices increases one by one up to the predetermined maximum number, the total impedance Zs' of the resonant circuit decreases, and a transmission current of the wireless power transmission device increases,
  wherein when the number of the power reception devices reaches the predetermined maximum number, the total impedance Zs' of the resonant circuit reaches a minimum value, and the transmission current of the wireless power transmission device increases to a maximum value,
  wherein when the number of the power reception devices decreases one by one from the predetermined maximum number, the total impedance Zs' of the resonant circuit increases, and the transmission current of the wireless power transmission device decreases in order to prevent an overcurrent in the wireless power transmission device.

2. The wireless power transmission device of claim 1, wherein, when the number of the power reception devices in the power transmission area of the wireless power transmission device is greater than the predetermined maximum number, the sum of imaginary parts of impedances Xs is not zero and the transmission current of the wireless power transmission device decreases.

3. The wireless power transmission device of claim 1, further comprising:
  an inverter circuit configured to convert external direct-current (DC) power into high-frequency power and supply the high-frequency power to the resonant circuit, and located at a front end of the resonant circuit;
  an oscillation circuit configured to generate a resonance frequency for driving the inverter circuit; and
  a DC power supply unit configured to drive the oscillation circuit.

4. The wireless power transmission device of claim 3, further comprising a control means configured to turn on or off DC power to be supplied to the DC power supply unit or a resonance frequency oscillation signal for driving the inverter circuit.

5. A wireless power transmission and reception system comprising:
  a wireless power transmission device comprising a resonant circuit including a matching circuit and a power transmission coil; and
  at least one wireless power reception device that receives power from the wireless power transmission device using magnetic resonance coupling without contact,
  wherein a total impedance Zs' of the resonant circuit is defined by:

$$Z'_S = (R_S + R_{eq}) + j\left(2\pi f L_s - \frac{1}{2\pi f C_S} + X_{eq}\right) = R'_S + jX_S,$$

wherein $R_s$ denotes an internal resistance of the resonant circuit,
  $R_{eq}$ denotes a sum of equivalent real resistances of a set power receiver,
  j is a symbol representing an imaginary number,
  f denotes a resonant frequency,
  $L_s$ denotes an inductance of the power transmission coil,
  $C_s$ denotes a capacitance of the matching circuit,
  $X_{eq}$ denotes a sum of equivalent imaginary impedances of the set power receiver,
  $R_s'$ denotes a sum of real resistances of the resonant circuit, and
  $X_s$ denotes a sum of imaginary parts of impedance of the resonant circuit,
  wherein the inductance $L_s$ of the power transmission coil and the capacitance $C_s$ of the matching circuit are determined such that $$X_S = \left(2\pi f L_S - \frac{1}{2\pi f C_S} + X_{eq}\right)$$

is non-zero when a number of power reception devices receiving power in a power transmission area of the wireless power transmission device is less than a predetermined maximum number, and $$X_S = \left(2\pi f L_S - \frac{1}{2\pi f C_S} + X_{eq}\right)$$

is zero when the number of the power reception devices is equal to the predetermined maximum number,
  wherein when the number of the power reception devices increases one by one up to the predetermined maximum number, the total impedance Zs' of the resonant circuit decreases, and a transmission current of the wireless power transmission device increases,
  wherein when the number of the power reception devices reaches the predetermined maximum number, the total impedance Zs' of the resonant circuit reaches a minimum value, and the transmission current of the wireless power transmission device increases to a maximum value,
  wherein when the number of the power reception devices decreases one by one from the predetermined maximum number, the total impedance Zs' of the resonant circuit increases, and the transmission current of the wireless power transmission device decreases in order to prevent an overcurrent in the wireless power transmission device.

6. The wireless power transmission and reception system of claim 5, wherein, when the number of the power reception devices in the power transmission area of the wireless power transmission device is greater than the predetermined maximum number, the sum of imaginary parts of impedances Xs is not zero and the transmission current of the wireless power transmission device decreases.

7. The wireless power transmission and reception system of claim 5, wherein the wireless power transmission device further comprises:
  an inverter circuit configured to convert external direct-current (DC) power into high-frequency power and supply the high-frequency power to the resonant circuit, and located at a front end of the resonant circuit;
  an oscillation circuit configured to generate a resonance frequency for driving the inverter circuit; and
  a DC power supply unit configured to drive the oscillation circuit.

8. The wireless power transmission and reception system of claim 7, wherein the wireless power transmission device further comprises a control means configured to turn on or off DC power to be supplied to the DC power supply unit or a resonance frequency oscillation signal for driving the inverter circuit.

\* \* \* \* \*